US009176968B2

(12) United States Patent
Krishna (10) Patent No.: US 9,176,968 B2
(45) Date of Patent: *Nov. 3, 2015

(54) OPERATING SYSTEM CONTROL OF DIRECTORY EVENTS WITH DYNAMIC PROGRAM EXECUTION

(71) Applicant: International Business Machines Corporation, Armonk, NY (US)

(72) Inventor: Prashanth S. Krishna, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/057,683

(22) Filed: Oct. 18, 2013

(65) Prior Publication Data

US 2014/0156717 A1 Jun. 5, 2014

Related U.S. Application Data (63) Continuation of application No. 13/690,537, filed on Nov. 30, 2012.

(51) Int. Cl.
*G06F 17/30* (2006.01)
*G06F 15/16* (2006.01)

(52) U.S. Cl.
CPC .... *G06F 17/30091* (2013.01); *G06F 17/30082* (2013.01)

(58) Field of Classification Search
CPC ................................. G06F 17/30091
See application file for complete search history.

(56) References Cited

U.S. PATENT DOCUMENTS

| | | |
|---|---|---|
| 7,386,529 B2 | 6/2008 | Kiessig et al. |
| 7,546,546 B2 | 6/2009 | Lewis-Bowen et al. |
| 2004/0054998 A1* | 3/2004 | Hayashi ........................ 718/102 |
| 2006/0129584 A1* | 6/2006 | Hoang et al. .................. 707/101 |
| 2007/0033200 A1 | 2/2007 | Gillespie |
| 2007/0199000 A1* | 8/2007 | Shekhel et al. ............... 719/330 |
| 2009/0064006 A1 | 3/2009 | Naick et al. |
| 2009/0196425 A1* | 8/2009 | Boland ......................... 380/278 |
| 2010/0205284 A1 | 8/2010 | Newton et al. |
| 2010/0257505 A1* | 10/2010 | Hinchey et al. ............... 717/101 |

OTHER PUBLICATIONS

Mostafa El-Kady, Folder Actions, Article, Feb. 18, 2011, pp. 1-10 (plus 4 citation pages added), Colorado State University, Published at: http://kiwi.atmos.colostate.edu/rr/tidbits/pdf/FolderActions.pdf.

(Continued)

*Primary Examiner* — Alex Gofman
(74) *Attorney, Agent, or Firm* — Lee Law, PLLC; Christopher B. Lee (57) ABSTRACT

A directory operational block data structure is provided by a processor within a memory. The directory operational block data structure allows configuration of a directory of a file system, at an operating-system level, with at least one executable program to be executed in response to configurable operating-system level directory events associated with the directory. A first program is attached within the directory operational block data structure to execute in response to a specified directory event. The attached first program is executed at the operating-system level in response to detection of the specified directory event.

7 Claims, 6 Drawing Sheets

(56) References Cited

OTHER PUBLICATIONS

Cory Bohon, AppleScript: Exploring the Power of Folder Actions, Part II, Webpage/site, Feb. 23, 2009, pp. 1-4, AOL, Inc., Published at: http://www.tuaw.com/2009/02/23/applescript-exploring-the-power-of-folder-actions-part-ii/.

Bill Gates, InDesign Scripts: Indd>PDF Folder Action, Webpage/site, Jun. 3, 2005, pp. 1-6, Adobe Systems Incorporated, Published at: http://www.adobe.com/cfusion/exchange/index.cfm?event=extensionDetail&loc=en__us&extid=1046591.

Author Unknown, Adding Automation Through Folder Actions, Webpage/site, Jan. 10, 2011, pp. 1-2, Apple Inc., Published/archived at: http://web.archive.org/web/20110110184234/http://www.apple.com/pro/tips/folderactions.html.

Author Unknown, Interface WatchService, Webpage/site, Printed from website on Oct. 18, 2012, pp. 1-4, Oracle Corporation, Published at: http://download.oracle.com/javase/7/docs/api/java/nio/file/WatchService.html.

Author Unknown, When Folders Change, Webpage/site, Printed from website on Oct. 18, 2012, pp. 1-3, Reliable Software, LLC, Published at: http://www.relisoft.com/win32/watcher.html.

Office Action for U.S. Appl. No. 13/690,537, Jul. 24, 2014, pp. 1-19.

Office Action for U.S. Appl. No. 13/690,537, Jan. 8, 2015, pp. 1-21.

Alex N. Gofman, Examiner, United States Patent and Trademark Office, Notice of Allowance for U.S. Appl. No. 13/690,537, Jul. 6, 2015, pp. 1-24, Alexandria, VA, USA.

* cited by examiner

OPERATING SYSTEM CONTROL OF DIRECTORY EVENTS WITH DYNAMIC PROGRAM EXECUTION

RELATED APPLICATIONS

This application is a continuation of, claims priority to, and claims the benefit of U.S. patent application Ser. No. 13/690,537, titled "OPERATING SYSTEM CONTROL OF DIRECTORY EVENTS WITH DYNAMIC PROGRAM EXECUTION," which was filed in the U.S. Patent and Trademark Office on Nov. 30, 2012, which is incorporated herein by reference in its entirety.

BACKGROUND

The present invention relates to operating system functionality. More particularly, the present invention relates to operating system control of directory events with dynamic program execution.

A directory within a file system operates as a container of files. Directory attributes allow assignment of directory access properties, such as read-only and hidden, to all files within the directory. The directory properties control access to files that are stored within the directory. File properties associated with a particular file control access to that file. For example, a file within a directory that has its read-only attribute set may not be modified, while a file within a directory that has its read-only attribute cleared may be modified. A directory with its hidden flag set will not appear in a higher-level directory listing.

BRIEF SUMMARY

A method includes providing, via a processor within a memory, a directory operational block data structure that allows configuration of a directory of a file system at an operating-system level with at least one executable program to be executed in response to configurable operating-system level directory events associated with the directory; attaching, within the directory operational block data structure, a first program to execute in response to a specified directory event; and executing, at the operating-system level, the attached first program in response to detection of the specified directory event.

A system includes a memory and a processor programmed to: provide a directory operational block data structure within the memory that allows configuration of a directory of a file system at an operating-system level with at least one executable program to be executed in response to configurable operating-system level directory events associated with the directory; attach, within the directory operational block data structure, a first program to execute in response to a specified directory event; and execute, at the operating-system level, the attached first program in response to detection of the specified directory event.

A computer program product includes a computer readable storage medium having computer readable program code embodied therewith, where the computer readable program code when executed on a computer causes the computer to: provide a directory operational block data structure that allows configuration of a directory of a file system at an operating-system level with at least one executable program to be executed in response to configurable operating-system level directory events associated with the directory; attach, within the directory operational block data structure, a first program to execute in response to a specified directory event; and execute, at the operating-system level, the attached first program in response to detection of the specified directory event.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides operating system control of directory events with dynamic program execution. The present subject matter extends a file system directory structure itself at an operating system level by adding at least one attribute to a directory operational control block of a file system of an operating system. The additional attributes are processed by the operating system in response to configured events (e.g., directory access, etc.) associated with the directory structure. One or more programs or scripts are assigned to be executed by the operating system in response to detection of the configured event(s) when the respective attribute(s) are set. Execution of the programs or scripts may be sequenced to further enhance functionality of operating system level program execution in response to directory events. The operating system executes and controls operation of the assigned programs or scripts in response to detection of a configured event with the directory based upon the state of the respective attribute(s). The program(s) or script(s) may further be executed in a "safe mode" or a "journaled mode" to prevent leaks or crashes that may occur during the course of execution. As such, the present subject matter provides improved functionality for directory structures of file systems, while maintaining stability of the directory structures and file systems. The present subject matter implements a concept that a directory is not just used as a placeholder for underlying files, but is a controller of the content that the directory contains.

It should be noted that conception of the present subject matter resulted from recognition of certain limitations associated with directories of file systems. For example, conventional file systems allow only assignment of directory access properties or attributes, such as read-only and hidden, to directories. As such, conventional file system directories operate only as placeholders for files. Additionally, conventional approaches where developers write event handles that operate at an application level are complex to create and are subject to error including file/data corruption. In view of the observation of these aspects of conventional directories of file systems, it was recognized that it is desirable to attach executable user programs and scripts to a directory that are executed by the operating system in response to directory events. It was further recognized that it was desirable to have the scripts be platform independent, such that they may be portable and executed by any operating system within which they are deployed. It was additionally recognized that it was desirable to execute the programs or scripts in a safe mode or journaled mode, depending upon the activities performed on a directory, to prevent leaks or crashes. The present subject matter improves directory structure functionality by providing for execution of programs and scripts by an operating system in a safe or journaled mode as appropriate for a given implementation in response to directory events, as described above and in more detail below. As such, improved file system directory structure functionality may be obtained through the operating system control of directory events with dynamic program execution described herein.

The operating system control of directory events with dynamic program execution described herein may be performed in real time to allow prompt attachment and execution of programs or scripts in response to detection of directory events. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
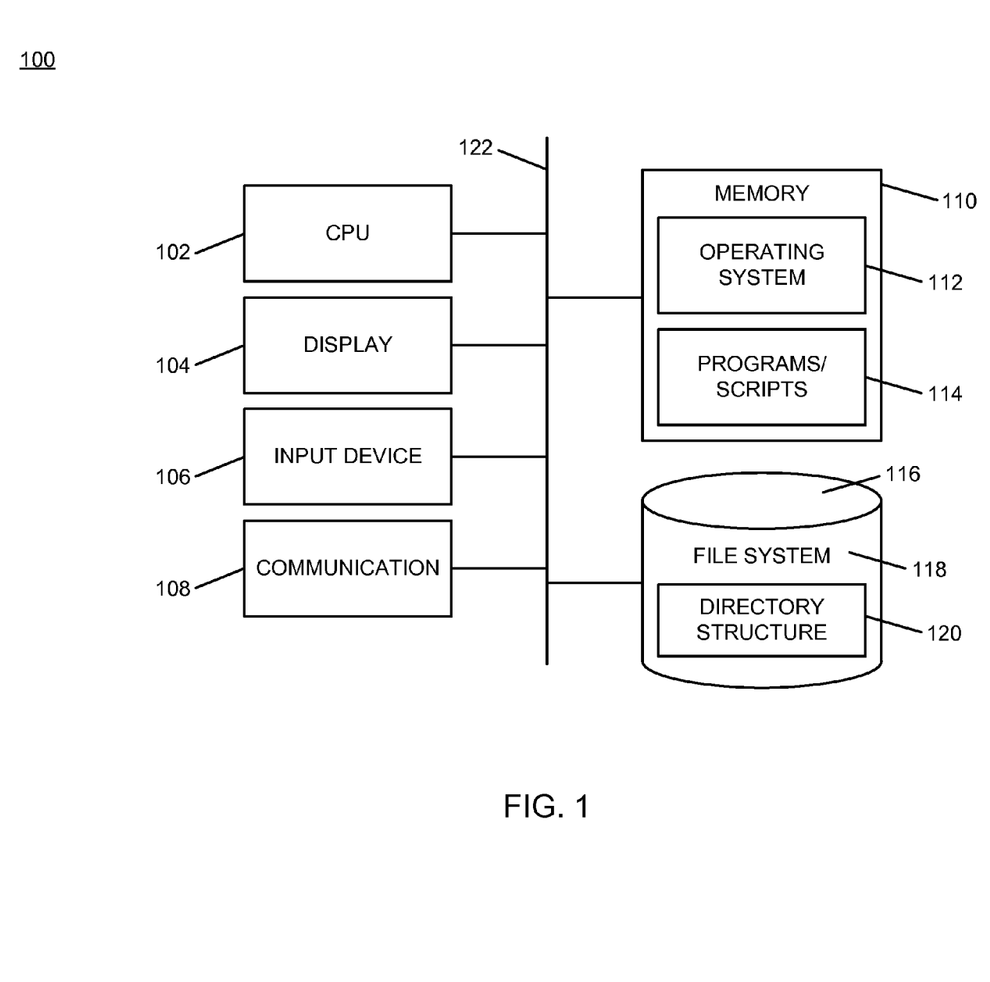
FIG. 1 is a block diagram of an example of an implementation of a core processing module capable of performing automated operating system control of directory events with dynamic program execution according to an embodiment of the present subject matter.

FIG. 1 is a block diagram of an example of an implementation of a core processing module 100 capable of performing automated operating system control of directory events with dynamic program execution. The core processing module 100 may be associated with either a computing device, a server, or other devices as appropriate for a given implementation. Further, the core processing module 100 may provide different and complementary processing of directory events where operations at one device result in communications with one or more other devices.

As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 102 provides computer instruction execution, computation, and other capabilities within the core processing module 100. A display 104 provides visual information to a user of the core processing module 100 and an input device 106 provides input capabilities for the user.

The display 104 may include any display device, such as a cathode ray tube (CRT), liquid crystal display (LCD), light emitting diode (LED), electronic ink displays, projection, touchscreen, or other display element or panel. The input device 106 may include a computer keyboard, a keypad, a mouse, a pen, a joystick, or any other type of input device by which the user may interact with and respond to information on the display 104.

A communication module 108 provides interconnection capabilities that allow the core processing module 100 to communicate with other modules within a system, such as within a networked communication and computing environment. The communication module 108 may include any electrical, protocol, and protocol conversion capabilities useable to provide the interconnection capabilities. Though the communication module 108 is illustrated as a component-level module for ease of illustration and description purposes, it should be noted that the communication module 108 may include any hardware, programmed processor(s), and memory used to carry out the functions of the communication module 108 as described above and in more detail below. For example, the communication module 108 may include additional controller circuitry in the form of application specific integrated circuits (ASICs), processors, antennas, and/or discrete integrated circuits and components for performing communication and electrical control activities associated with the communication module 108. Additionally, the communication module 108 may include interrupt-level, stack-level, and application-level modules as appropriate. Furthermore, the communication module 108 may include any memory components used for storage, execution, and data processing for performing processing activities associated with the communication module 108. The communication module 108 may also form a portion of other circuitry described without departure from the scope of the present subject matter.

A memory 110 includes an operating system 112 that is executed by the CPU 102. The operating system 112 includes a task manager (not separately illustrated) that may periodically and/or aperiodically manage tasks within the operating system 112. A programs/scripts storage area 114 stores one or more programs or scripts that may be executed by the operating system in response to directory events, as described above and in more detail below.

It is understood that the memory 110 may include any combination of volatile and non-volatile memory suitable for the intended purpose, distributed or localized as appropriate, and may include other memory segments not illustrated within the present example for ease of illustration purposes. For example, the memory 110 may include a code storage area, an operating system storage area, a code execution area, and a data area without departure from the scope of the present subject matter.

A file storage device 116 includes a file system 118 that defines an organization for a directory structure 120. The file storage device 116 may be any device capable of storing one or more files, such as one or more hard disk drives, optical disk drives, universal serial bus (USB) drives, or any other device(s) appropriate for a given implementation.

The CPU 102, the display 104, the input device 106, the communication module 108, the memory 110, and the file storage device 116 are interconnected via an interconnection 122. The interconnection 122 may include a system bus, a network, or any other interconnection capable of providing the respective components with suitable interconnection for the respective purpose.

While the core processing module 100 is illustrated with and has certain components described, other modules and components may be associated with the core processing module 100 without departure from the scope of the present subject matter. Additionally, it should be noted that, while the core processing module 100 is described as a single device for ease of illustration purposes, the components within the core processing module 100 may be co-located or distributed and interconnected via a network without departure from the scope of the present subject matter. For a distributed arrangement, the display 104 and the input device 106 may be located at a point of sale device, kiosk, or other location, while the CPU 102 and memory 110 may be located at a local or remote server. Many other possible arrangements for components of the core processing module 100 are possible and all are considered within the scope of the present subject matter. It should also be understood that, though the file storage device 116 is shown as a separate device, the file system 118 and the directory system 120 may also be stored and operate within the memory 110 without departure from the scope of the present subject matter. Accordingly, the core processing module 100 may take many forms and may be associated with many platforms.

Figure 2:
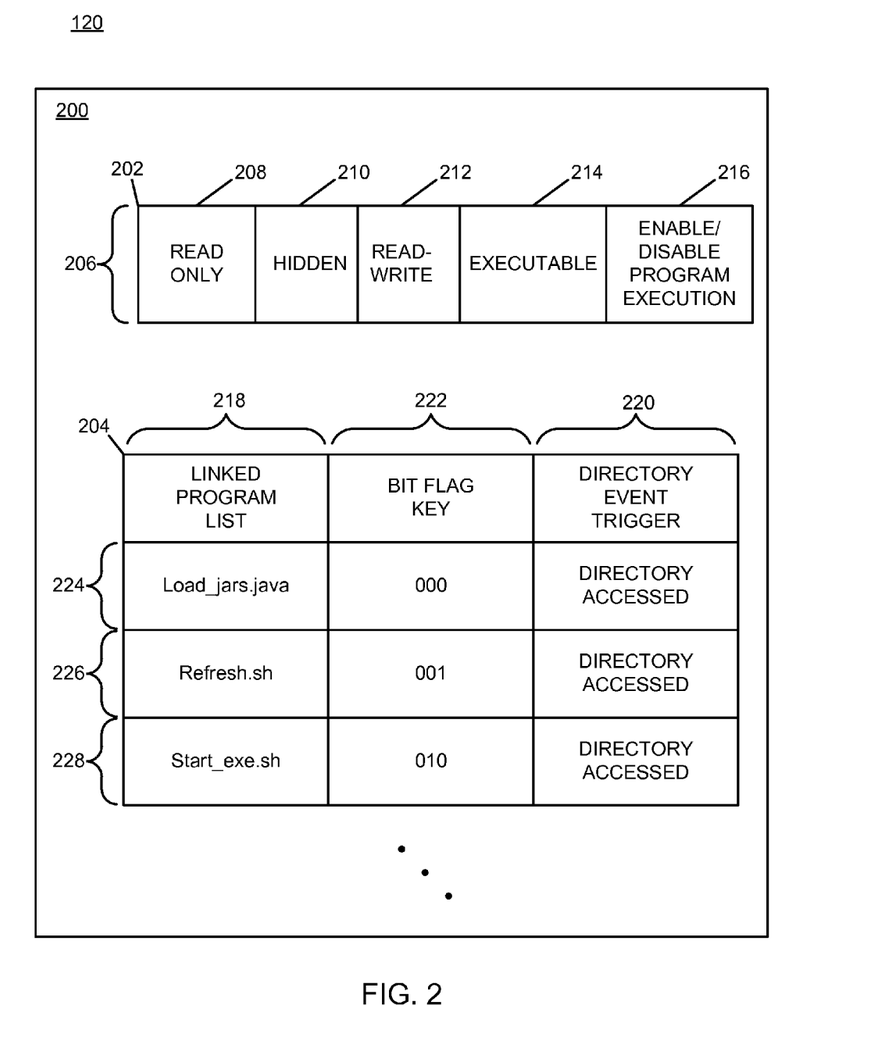
FIG. 2 is a block diagram of an example of an implementation of memory allocations for a control block and an operational block of the directory structure within the file system of FIG. 1 according to an embodiment of the present subject matter.

FIG. 2 is a block diagram of an example of an implementation of memory allocations 200 for a control block 202 and an operational block 204 of the directory structure 120 within the file system 118 of FIG. 1. The examples of the control block 202 and the operational block 204 provide details of one possible implementation of automated operating system control of directory events with dynamic program execution for a directory defined within the directory structure 120. It should be understood that many additional examples and implementations are possible and all are considered within the scope of the present subject matter. The control block 202 and the operational block 204 for a single directory within the directory structure 120 are illustrated due to space limitations within FIG. 2. However, it should be understood that control blocks and operational blocks, such as the control block 202 and the operational block 204, may be defined for each directory that is created within the directory structure 120.

The present subject matter introduces a level of indirection, such that actions performed on the directory are routed via the control block 202 to an operating system, such as the operating system 112, for execution by a processor, such as the CPU 102. The control block 202 is shown as a table of a set of bit fields/attributes within a row 206. A read-only attribute 208 may be used to indicate that the directory controlled by the control block 202 is configured as a read-only directory. Similarly, a hidden attribute 210, a read-write attribute 212, and an executable attribute 214 may be used to indicate that the directory is hidden, read-write enabled, and that programs may be executed within the directory, respectively. An enable/disable program execution attribute 216 marks the enablement/disablement of dynamic program execution in response to directory events, as described above and in more detail below. If the enable/disable program execution attribute 216 is enabled within the control block 202, one or more subsequent actions to be performed will be inferred from/identified by the operational block 204. Within the present example, the operational block 204 shows octal bit patterns mapped to corresponding programs and events that the directory within the directory structure 120 may support. It should be noted that FIG. 2 is a generic representation of a directory of a file system. Any attributes that are not utilized within a specific file system may be omitted as appropriate for a given implementation.

Within the operational block 204, a linked program list column 218 identifies programs that are linked for execution in response to directory events defined within a directory event trigger column 220. A bit flag key column 222 specifies an order of processing of the linked program list in response to configured directory events.

As such, for purposes of the present example, a "Load_jars.java" program is linked within a row 224 at bit position zero (e.g., binary 000) and triggers in response to a "Directory Accessed" event. The "Load_jars.java" program triggers in response to the directory being accessed to load all jar files stored within the directory. As such, configuration of a program development environment that utilizes jar files stored within a directory that is used for program development and/or debug may be automatically performed in response to a detected access to a development directory.

Similarly, a "Refresh.sh" script is linked within a row 226 at bit position one (e.g., binary 001) and triggers in response to the same "Directory Accessed" event. The "Refresh.sh" script refreshes the directory view after the jars have been loaded by the "Load_jar.java" program.

Additionally, a "Start_exe.sh" script is linked within a row 228 at bit position two (e.g., binary 010) and triggers in response to the same "Directory Accessed" event. The "Start_exe.sh" initiates execution of an executable program, such as a software development or debugging environment either stored within the directory or as identified within the "Start_exe.sh" script.

As such, in response to a single directory access, such as a command line-entered command to change to a directory (e.g., CD C:\Users\myDir), the configured sequence of actions may be performed. It should be noted that the present example shows this particular sequence of actions that may be performed in response to a single directory event for purposes of example. However, it should be noted that different directory events may be configured and processed in response to operating system level detection of those events.

Additional directory events may include, for example entry into a directory (e.g., via a double click operation), exit from a directory, and single click on a directory to highlight it. It should be noted that the present technology may be used by graphical user interface (GUI) based programs to show a thumbnail view of the contents of a directory, and processing may be invoked as described above and in more detail below. Further extensions may be to programmatically trigger events for multiple directories that may run all of the programs associated with the respective directories.

It should additionally be noted that the present example utilizes a three bit field for use within the bit flag key column 222. However, this should not be considered limiting as any bit field width may be used as appropriate for a given implementation.

The following pseudo syntax examples provide possible command implementations that may be used in association with the present subject matter to configure program associations/linkages for execution and directory events for triggering linked programs. This example listing is not exhaustive as many other command implementations are possible and all are considered within the scope of the present subject matter.

The following first pseudo syntax example shows one possible attach program ("attachpgm") command syntax format that may be used to attach a program to an operational block, such as the operational block 204.

attachpgm <dir> <program with exec rights> <octal flag>

This attach program command attaches a program to the directory with the octal flags used as a mapping element. An example use of the attach program command is as follows:

attachpgm myDir refresh.sh 1

This use of the attach program command as shown above attaches a script called "refresh.sh" to a directory named "myDir" as the second program within the linked program list, as shown within FIG. 2 and described above.

The following second pseudo syntax example shows one possible change mode ("chmod") command syntax format that may be used to change the operation mode identified by a control block, such as the control block 202.

chmod (or any other new command) 755'0' <dir>

This change mode command controls the control block 202 and may be used to grant access to performing the act of attaching programs to directories, such as by use of the attach program command described above. An example use of the change mode command is as follows:

chmod 7551 myDir

This use of the change mode command sets the enable/disable program execution attribute 216. A directory called "myDir" is granted access to support program attachment. More refinements may be performed to grant this access to selected users. For example, the change mode command may be modified to accept one or more user identifiers, and user identifiers provided within the change mode command may be granted access to attach programs to directories.

The following third pseudo syntax example shows one possible execute folder ("execFolder") command syntax format that may be used to execute programs identified within an operational block, such as the operational block 204.

execFolder <dir> <comma separated flags>

This execute folder command executes the attached programs in the order of flags mentioned in the command line argument. As such, default ordering as configured within the operational block 204 may be changed at the command line. An example use of the execute folder command is as follows:

execFolder myDir 0,1

This use of the execute folder command executes programs on a directory named "myDir" mapped against flags at positions zero and one (e.g., binary 000 and 001) within the operational block 204.

The following fourth pseudo syntax example shows one possible map events ("mapEvents") command syntax format that may be used to map events to programs identified within an operational block, such as the operational block 204.

mapEvents <dir> <eventName=Octal flags>+

This map events command maps the directory events to the actions that are to be performed when the event occurs. The plus sign (e.g., "+") denotes that one or more events may be configured using a single instruction. An example use of the map events command is as follows:

mapEvents myDir DirectoryAccessed=7

This use of the map events command configures the program mapped against/linked to bit flag seven (e.g., octal 7 or 111) when the directory called "myDir" is accessed.

The above example commands may be made to return exit codes based on the success/failure state of their respective execution. For example, the map events command may fail if the attach program command was not previously executed to create the program mapping.

Several options and optimizations for the present subject matter are possible. For example, timeout settings may be provided to prevent programs that may be stuck in a loop and that continue executing (e.g., such as waiting for a user to respond). Such a configuration may be provided either by a command line option or in the form of a configuration (e.g., ".config") file. The attached program may be suspended automatically if the configured timeout is exceeded. As such, a script developer may calculate an amount of time that a script is planned to take for execution and may configure a timeout accordingly.

Further, script execution may be configured for asynchronous execution to allow a user to perform any other actions between script executions for sequential scripting. A "pause" identifier may be configured for such a situation and added to an operational block.

Additionally, if a user is in the process of updating a file inside of a directory and the result of the action requires a modification to the file, then the new file may be automatically versioned and stored with a filename that specifies an update to the file (e.g., <filename_update>, <filename_ver2>, <filename_date>, etc.). Such processing may allow the user to revert to either of the files without requiring manual file naming operations for creation of the updated file. The process of updating the file may be detected by the operating system and the new file and filename may be created. The default action may be to overwrite the directory contents, but this option may be enabled for all or specified users.

Permissions may also be implemented. For example, the permission grant to modify the enable/disable program execution attribute 216 in the control block 202 may be performed in a manner that complies with any relevant security constraints of a specific operating system. For example, in a Unix® system, certain users may be granted access to attach programs to directories administered by the root user or root equivalent user.

As such, the present subject matter allows users to personalize and customize folders in the way that they prefer. For example, the user may attach a program to a directory that downloads mails from a mail server at a scheduled time or times. The folder may be designated to just hold the latest mails and processing may be automatically performed to move older files to a subdirectory or to rename older mails.

The present subject matter also bridges user space and kernel space by exposing some of the operating system internals for configuration by the user. Users may configure operating system level functionality that is executed by operating system level processing in response to directory events, which may enhance the user's experience.

Additionally, while the examples above represent command line implementations, the present subject matter may be implemented within a graphical user interface (GUI). In such an implementation, programs that are mapped within an operational block, such as the operational block 204 may be displayed as a menu option when a folder/directory is right-clicked. Additionally, options to configure directory events as described above and additional processing may be provided to a user via the GUI and implemented for operating system level functionality.

The structures represented within FIG. 2 may be implemented as a C-language self-referential structure, such as available within a Linux® file system. Additional configuration fields may be added as members within the existing C-language self-referential structures. It should additionally be noted that existing file systems may be migrated to the present subject matter without any loss of data, as these attributes are additionally added fields, and existing directory management fields would not be changed.

FIG. 3 through FIG. 5B described below represent example processes that may be executed by devices, such as the core processing module 100, to perform the automated operating system control of directory events with dynamic program execution associated with the present subject matter. Many other variations on the example processes are possible and all are considered within the scope of the present subject matter. The example processes may be performed by hardware and/or hardware-software modules and/or executed by the CPU 102. It should be noted that timeout procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added without departure from the scope of the present subject matter.

Figure 3:
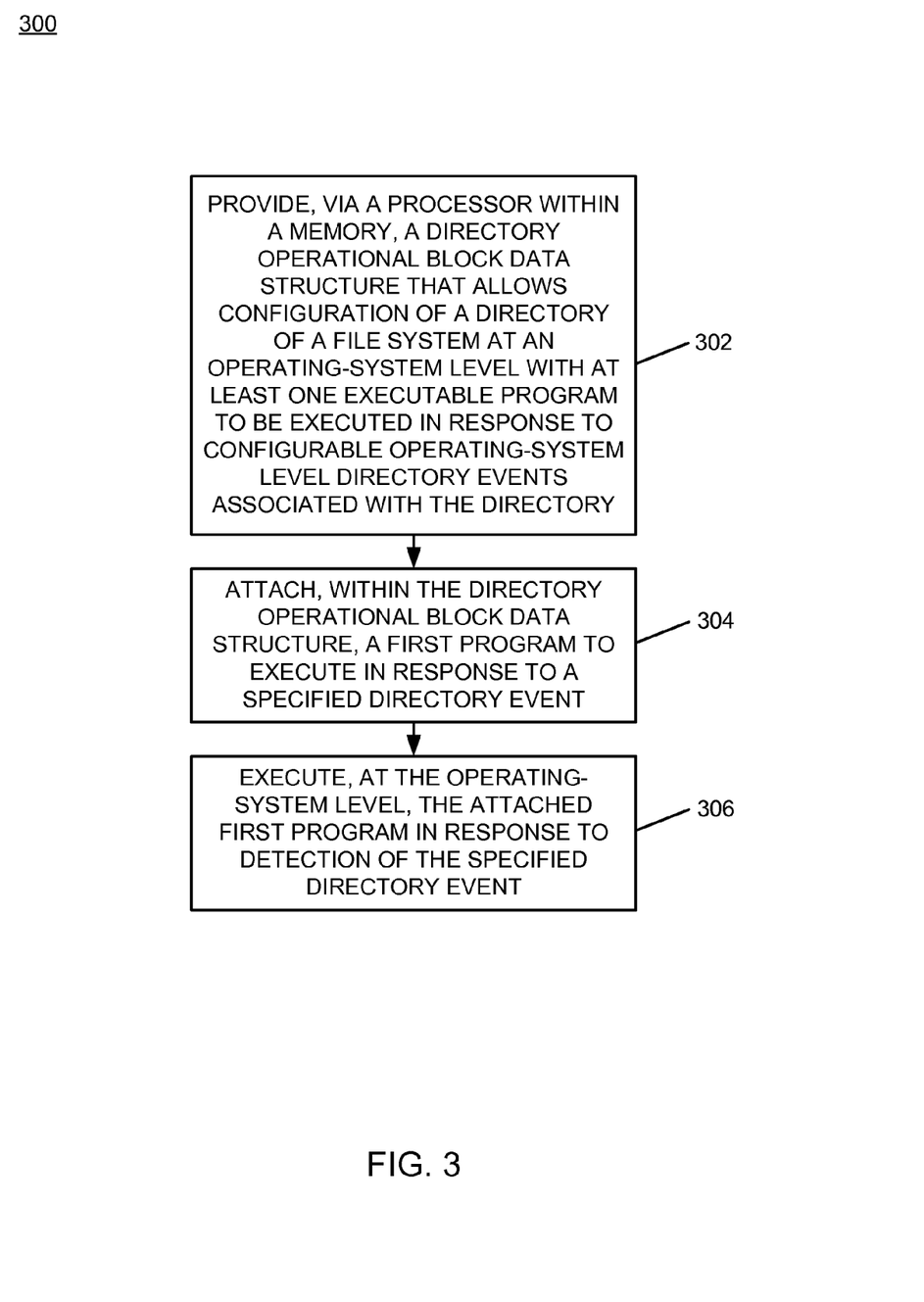
FIG. 3 is a flow chart of an example of an implementation of a process for automated operating system control of directory events with dynamic program execution according to an embodiment of the present subject matter.

FIG. 3 is a flow chart of an example of an implementation of a process 300 for automated operating system control of directory events with dynamic program execution. At block 302, the process 300 provides, via a processor within a memory, a directory operational block data structure that allows configuration of a directory of a file system at an operating-system level with at least one executable program to be executed in response to configurable operating-system level directory events associated with the directory. At block 304, the process 300 attaches, within the directory operational block data structure, a first program to execute in response to a specified directory event. At block 306, the process 300 executes, at the operating-system level, the attached first program in response to detection of the specified directory event.

Figure 4:
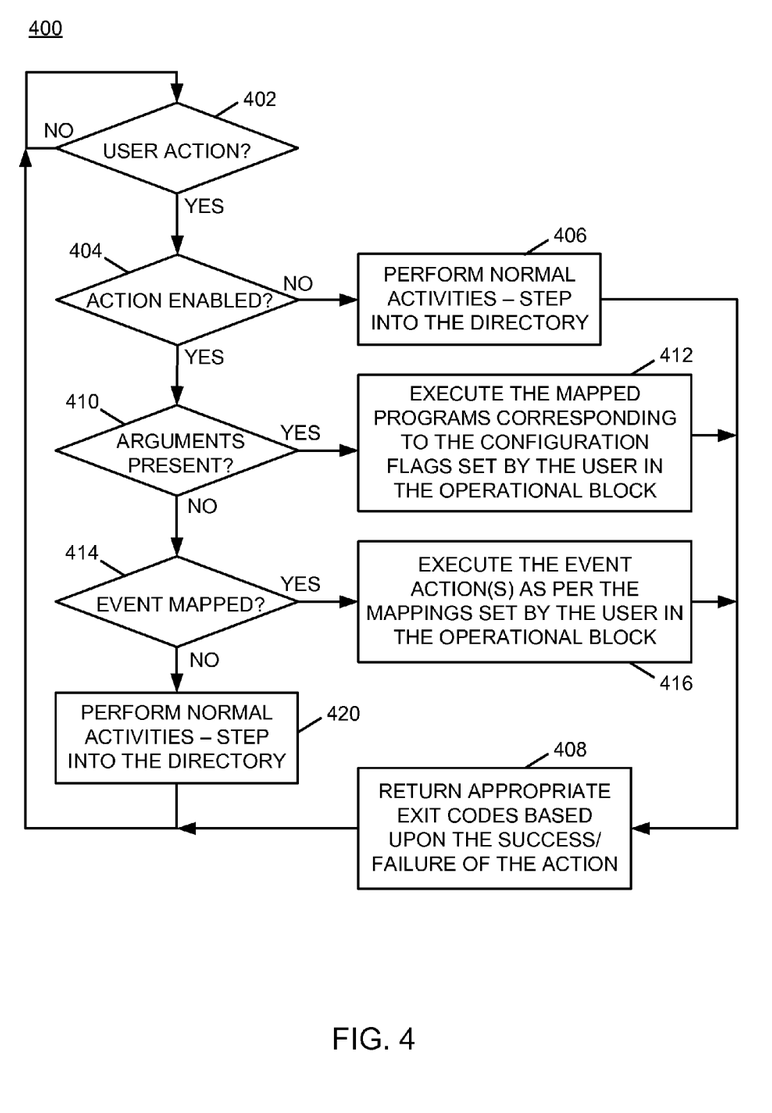
FIG. 4 is a flow chart of an example of an implementation of a process for operating system control of directory events with dynamic program execution in response to detection of user initiated directory events according to an embodiment of the present subject matter.

FIG. 4 is a flow chart of an example of an implementation of a process 400 for operating system control of directory events with dynamic program execution in response to detection of user initiated directory events. It should be noted that while the process 400 is shown to be iterative, this is not a requirement and single-pass processing for any given event may be used without departure from the scope of the present subject matter (e.g., with start and end nodes indicating start and end points of particular branches of processing). At decision point 402, the process 400 makes a determination as to whether a user action associated with a directory has been detected. For purposes of the present example, the user action associated with the directory may include a directory access action (e.g., a command line directory change instruction, a graphical user interface directory navigation, etc.).

In response to determining that a user action associated with a directory has been detected, the process 400 makes a determination at decision point 404 as to whether one or more directory actions are enabled and configured, such as via the enable/disable program execution attribute 216 within the control block 202 and via the operational block 204, respectively.

In response to determining that no directory actions are enabled and configured at decision point 404, the process 400 performs normal directory processing, such as stepping into the directory in response to the detected user action at block 406. At block 408, the process 400 returns an appropriate exit code based upon the success/failure of the action, returns to decision point 402, and iterates as described above.

Returning to the description of decision point 404, in response to determining that one or more directory actions are enabled and configured, the process 400 makes a determination at decision point 410 as to whether any arguments, such as command-line arguments or GUI-generated arguments, are present in association with the detected user action. Several of the pseudo syntax examples above show examples of arguments. In response to determining that one or more arguments are present in association with the detected user action, at block 412 the process 400 executes the mapped programs corresponding to the configuration flags set/configured by the user within the operational block (e.g., within the bit flag key column 222 of the operational block 204). It is understood that the process 400 may also step into the directory at block 412 where the detected user action is a directory access user action. The process 400 returns to block 408 and returns an appropriate exit code based upon the success/failure of the action, returns to decision point 402, and iterates as described above.

Returning to the description of decision point 410, in response to determining that no arguments are present in association with the detected user action, the process 400 makes a determination at decision point 414 as to whether any events are also mapped to the configured user action. At block 416, in response to determining that there is at least one event mapped to the configured user action, the process 400 executes the event action(s) as configured per the mappings set/configured by the user within the operational control block 204. The process 400 returns to block 408 and returns an appropriate exit code based upon the success/failure of the action, returns to decision point 402, and iterates as described above.

Returning to the description of decision point 414, in response to determining that no events are mapped to the configured user action, the process 400 performs normal directory processing at block 420, such as stepping into the directory in response to the detected user action. The process 400 returns to decision point 402 and iterates as described above.

As such, the process 400 processes user actions associated with directories. The process 400 determines whether any arguments or events are mapped to detected user events and processes any identified arguments and configured events.

Figure 5A:
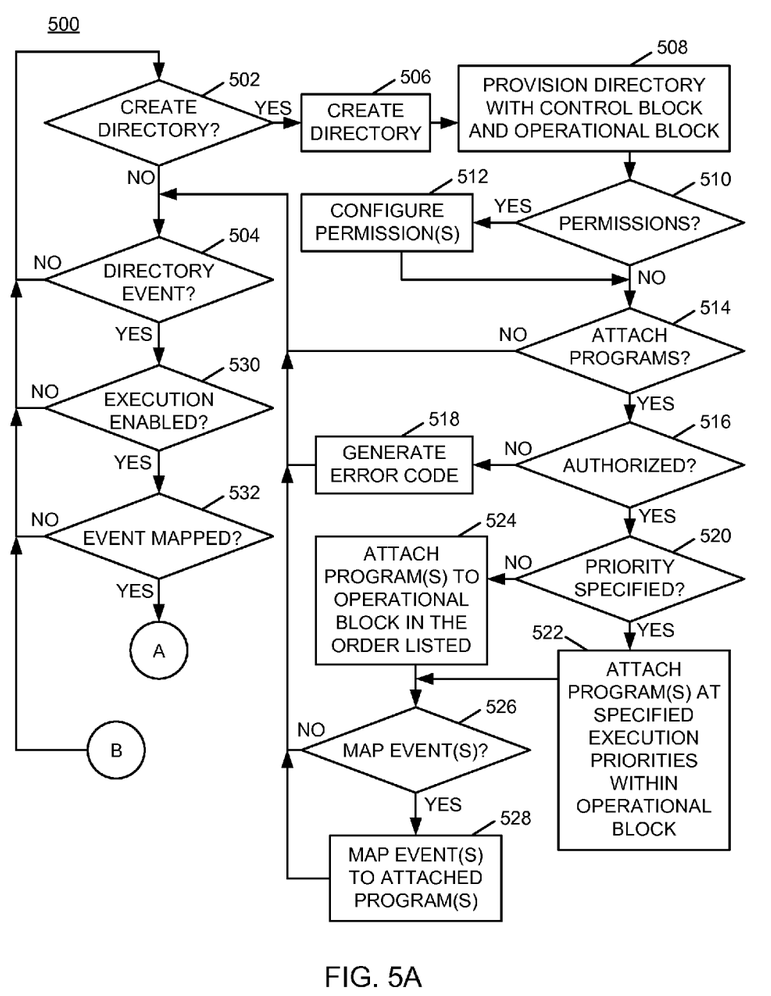
FIG. 5A is a flow chart of an example of an implementation of initial processing with a process for configuration and execution of operating system control of directory events with dynamic program execution according to an embodiment of the present subject matter.
Figure 5B:
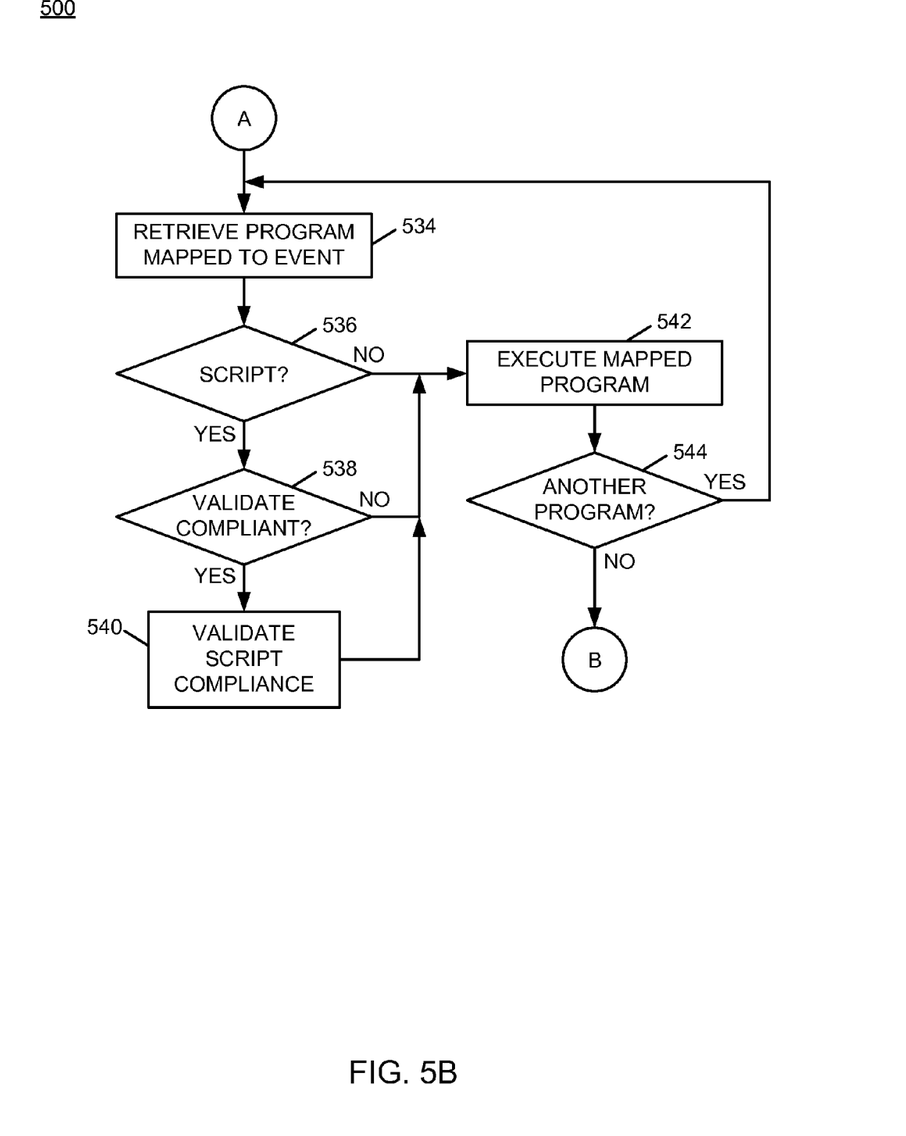
FIG. 5B is a flow chart of an example of an implementation of additional processing with a process for configuration and execution of operating system control of directory events with dynamic program execution according to an embodiment of the present subject matter.

FIGS. 5A-5B illustrate a flow chart of an example of an implementation of process 500 for configuration and execution of operating system control of directory events with dynamic program execution. FIG. 5A illustrates initial processing within the process 500. It should be noted that while the process 500 is shown to be iterative, this is not a requirement and single-pass processing for any given event may be used without departure from the scope of the present subject matter (e.g., with start and end nodes indicating start and end points of particular branches of processing). At decision point 502, the process 500 makes a determination as to whether a directory creation event has been detected. A description of detailed processing for an affirmative determination at decision point 502 will be deferred and described further below to complete a description of higher-level processing within the process 500.

As such, in response to determining at decision point 502 that a directory creation event has not been detected, the process 500 begins processing associated with directory access events and makes a determination at decision point 504 as to whether a directory event has been detected. In response to determining that a directory event has not been detected the process 500 returns to decision point 502 and iterates as described above.

Returning to the description of decision point 502, in response to determining that a directory creation event has been detected, the process 500 creates the requested directory, such as the file system 118 and the directory structure 120, at block 506. At block 508, the process 500 provisions the directory within the directory structure with a control block data structure and an operational block data structure.

At decision point 510, the process 500 makes a determination as to whether at least one permission criterion has been specified in association with the directory creation event. A permission criterion may be configured to specify authorization of one or more users (e.g., via a user identifier) to attach programs to the directory operational block data structure for execution in response to directory events. As such, in response to determining at decision point 510 that at least one permission criterion has been specified in association with the directory creation event, the process 500 configures the respective permission(s) to attach programs to the directory operational block data structure at block 512.

In response to determining at decision point 510 that at least one permission criterion has not been specified in association with the directory creation event, or in response to configuring the respective permission(s) to attach programs to the directory operational block data structure at block 512, the process 500 makes a determination at decision point 514 as to whether a request to attach one or more programs to the directory has been detected. It should be noted that the determination at decision point 514 may alternatively be performed as part of the higher-level processing and is described at this location within the process 500 for ease of description purposes.

As such, in response to determining at decision point 514 that a request to attach one or more programs to the directory has not been detected, the process 500 returns to decision point 504 and iterates as described above. In response to determining at decision point 514 that a request to attach one or more programs to the directory has been detected, the process 500 makes a determination, based upon any configured permission(s), as to whether the requesting user is authorized to attach programs to the directory for execution in response to directory events at decision point 516. For example, the process 500 may determine a user identifier of a user issuing a configuration command for the directory operational block data structure. The process 500 may determine whether the identified user has permission to attach programs to the directory operational block data structure based upon at least one permission criterion. In response to determining that the user is not authorized to attach programs to the directory for execution in response to directory events at decision point 516, the process 500 generates an error code at block 518 and returns to decision point 504 and iterates as described above.

In response to determining that the user is authorized to attach programs to the directory for execution in response to directory events at decision point 516, the process 500 makes a determination at decision point 520 as to whether a priority of execution for at least one of the programs to be attached to the directory has been specified. In response to determining that a priority of execution for at least one of the programs to be attached to the directory has been specified, the process 500 attaches the respective programs at the specified execution priorities within the configured operational block data structure at block 522. For example, the process 500 may assign a program to positions in the directory operational block data structure associated with execution sequence identifiers specified for the respective programs. In response to determining at decision point 520 that a priority of execution for at least one of the programs to be attached to the directory has not been specified, the process 500 attaches the respective programs to the configured operational block data structure in the order listed in the request at block 524.

In response to attaching the respective programs to the configured operational block data structure either with the specified execution priorities at block 522 or in the order listed in the request at block 524, the process 500 makes a determination at decision point 526 as to whether to map one or more events to the respective attached programs. The determination to map one or more events to the respective attached programs may be made, for example, using event mappings specified by a user in an event mapping request or within the original request to attach one or more programs to the directory.

In response to determining to map at least one event to at least one attached program at decision point 526, the process 500 maps the respective event(s) to the respective attached program(s) at block 528. For example, the process 500 may map the respective programs to directory event trigger(s) within the directory operational block data structure that identify the specified directory event(s) for which the programs are to be executed. In response to mapping the respective event(s) to the respective attached program(s) at block 528, or in response to determining not to map at least one event to at least one attached program at decision point 526, the process 500 returns to decision point 504 and iterates as described above.

Returning to the description of decision point 504, in response to determining that a directory event has been detected, the process 500 makes a determination at decision point 530 as to whether execution of programs identified within the directory operational block data structure is enabled. In response to determining that execution of programs identified within the directory operational block data structure is not enabled, the process 500 returns to decision point 502 and iterates as described above.

In response to determining at decision point 530 that execution of programs identified within the directory operational block data structure is enabled, the process 500 makes a determination at decision point 532 as to whether the detected directory event is mapped to at least one program attached to the directory. In response to determining that the detected directory event is not mapped to at least one program attached to the directory at decision point 532, the process 500 returns to decision point 502 and iterates as described above.

In response to determining that the detected directory event is mapped to at least one program attached to the directory at decision point 532, the process 500 transitions to the processing shown and described in association with FIG. 5B.

FIG. 5B illustrates additional processing associated with the process 500 for configuration and execution of operating system control of directory events with dynamic program execution. At block 534, the process 500 retrieves the program that is mapped to the event. It should be noted that if more than one program is mapped to the directory event, the programs may be executed in the order listed or may be executed according to a prioritized mapping order (e.g., as specified by execution sequence identifiers), as described above. As such, the process 500 may execute the attached programs in a sequence with the additional attached programs based upon an order of the respective programs as specified by a set of execution sequence identifiers.

At decision point 536, the process 500 makes a determination as to whether the retrieved program is a script. As described above, validation of scripts may be performed in real time to increase stability among other benefits. As such, in response to determining at decision point 536 that the retrieved program is a script, the process 500 makes a determination at decision point 538 as to whether to validate that the script is compliant with scripting requirements for scripts within the current operating system environment.

In response to determining at decision point 538 to validate that the script is compliant with execution requirements for scripts within the current operating system environment, the process 500 validates the script's compliance with scripting requirements for the operating system at block 540. In response to determining at decision point 536 that the retrieved program is not a script, or in response to determining at decision point 538 not to validate the script's compliance with execution requirements for scripts within the current operating system environment, or in response to validating that the script is compliant with scripting requirements for the operating system at block 540, the process 500 executes the mapped program at the operating-system level at block 542. It should be noted that the program may be executed at the operating-system level in one of a safe mode and a journaled mode, as described above.

At decision point 544, the process 500 makes a determination as to whether another program is attached to the directory and mapped to the detected directory event. In response to determining that another program is attached to the directory and mapped to the detected directory event, the process 500 returns to block 534 to retrieve the next program that is mapped to the detected directory event and iterates as described above. In response to determining at decision point 544 that all attached programs have been executed, the process 500 returns to the processing described in association with FIG. 5A at decision point 502 and iterates as described above.

As such, the process 500 responds to directory creation events and provides/provisions a directory operational block data structure that allows configuration of a directory of a file system at an operating-system level with at least one executable program to be executed in response to configurable operating-system level directory events associated with the directory. The process 500 also allows attachment of programs, performs program attachment authorization configuration and enforcement, and allows attachment of programs in specified execution sequences. The process 500 further permits mapping of directory events to the attached programs and execution of the attached program(s) in response to directory events and determinations that execution of the attached/mapped programs is enabled. Programs that are attached may be retrieved according to a prioritized sequence. Additionally, scripts may be validated and executed in response to the script being validated as compliant with scripting requirements for the operating system. Programs may be executed in one of a safe mode and a journaled mode.

As described above in association with FIG. 1 through FIG. 5B, the example systems and processes provide operating system control of directory events with dynamic program execution. Many other variations and additional activities associated with operating system control of directory events with dynamic program execution are possible and all are considered within the scope of the present subject matter.

Those skilled in the art will recognize, upon consideration of the above teachings, that certain of the above examples are based upon use of a programmed processor, such as the CPU 102. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   providing, via a processor within a memory, a directory operational block data structure that allows configuration of a directory of a file system at an operating-system level with at least one executable program to be executed in response to configurable operating-system level directory events associated with the directory, where the directory operational block data structure is configurable with at least one permission criterion for authorization to attach programs to the directory operational block data structure for execution in response to directory events;
   attaching, within the directory operational block data structure in response to determining that a user issuing a configuration command for the directory operational block data structure has permission to attach the programs to the directory operational block data structure, a first program to execute in response to a specified directory event; and
   executing, at the operating-system level in one of a safe mode and a journaled mode, the attached first program in response to detection of the specified directory event.

2. The method of claim 1, where attaching, within the directory operational block data structure in response to determining that the user issuing the configuration command for the directory operational block data structure has permission to attach the programs to the directory operational block data structure, the first program to execute in response to the specified directory event comprises attaching the first program to execute in response to the specified directory event in an order specified by a first execution sequence identifier and further comprising:
   attaching, within the directory operational block data structure, a second program to execute in response to the specified directory event in an order specified by a second execution sequence identifier.

3. The method of claim 2, where executing, at the operating-system level in one of the safe mode and the journaled mode, the attached first program in response to the detection of the specified directory event comprises executing the attached first program in a sequence with the attached second program based upon the order specified by the first and second execution sequence identifiers.

4. The method of claim 1, where attaching, within the directory operational block data structure in response to determining that the user issuing the configuration command for the directory operational block data structure has permission to attach the programs to the directory operational block data structure, the first program to execute in response to the specified directory event comprises:
- assigning the first program to a position in the directory operational block data structure associated with an execution sequence identifier; and
- mapping the first program to a directory event trigger within the directory operational block data structure that identifies the specified directory event.

5. The method of claim 1, where attaching, within the directory operational block data structure in response to determining that the user issuing the configuration command for the directory operational block data structure has permission to attach the programs to the directory operational block data structure, the first program to execute in response to the specified directory event comprises:
- determining a user identifier of the user issuing the configuration command for the directory operational block data structure; and
- determining whether the user has permission to attach the programs to the directory operational block data structure based upon the user identifier being specified within the at least one permission criterion.

6. The method of claim 1, where the attached first program comprises a script and where executing, at the operating-system level in one of the safe mode and the journaled mode, the attached first program in response to the detection of the specified directory event comprises:
- validating that the script is compliant with scripting requirements for an operating system executed within the operating-system level; and
- executing the script in response to the script being validated as compliant with scripting requirements for the operating system.

7. The method of claim 1, where executing, at the operating-system level in one of the safe mode and the journaled mode, the attached first program in response to the detection of the specified directory event comprises:
- determining whether execution of programs identified within the directory operational block data structure is enabled; and
- executing the attached first program in response to determining that the execution of programs within the directory operational block data structure is enabled.

* * * * *